United States Patent [19]

Zboroski et al.

[11] Patent Number: 5,053,344

[45] Date of Patent: Oct. 1, 1991

[54] MAGNETIC FIELD SEPARATION AND ANALYSIS SYSTEM

[75] Inventors: Maciej Zborowski, Lakewood; Paul S. Malchesky, Painesville, both of Ohio

[73] Assignee: Cleveland Clinic Foundation, Cleveland, Ohio

[21] Appl. No.: 579,247

[22] Filed: Sep. 4, 1990

Related U.S. Application Data

[63] Continuation of Ser. No. 81,223, Aug. 4, 1987, abandoned.

[51] Int. Cl.[5] .................. B03C 1/02; B03C 1/035; G01N 1/00; G01N 27/74

[52] U.S. Cl. .................. 436/177; 436/526; 356/38; 209/212; 209/213; 209/214; 209/215; 209/223.1; 209/232

[58] Field of Search .................. 436/177, 526; 435/239, 435/261; 209/212, 213, 214, 215, 223.1, 232; 210/222, 695; 356/38

[56] References Cited

U.S. PATENT DOCUMENTS

| | | | |
|---|---|---|---|
| 3,788,465 | 1/1974 | Reimers et al. | 209/232 |
| 4,047,814 | 9/1977 | Westcott | 356/38 |
| 4,769,130 | 9/1988 | Christensen | 209/223.1 |

FOREIGN PATENT DOCUMENTS

| | | | |
|---|---|---|---|
| 0578107 | 10/1977 | U.S.S.R. | 209/232 |

*Primary Examiner*—David L. Lacey
*Assistant Examiner*—Kimberly A. Trautman
*Attorney, Agent, or Firm*—Fay, Sharpe, Beall, Fagan, Minnich & McKee

[57] ABSTRACT

A magnetic field separation system includes a magnet unit having first and second pole members forming a linear gap with a relatively high magnetic field density therebetween. A flow chamber comprised of first and second optically transparent slides mounted so as to define a generally planar fluid pathway therebetween, passes a biological fluid over the linear gap at an angle, with flow through the pathway being accomplished by gravity and capillary action. Biological fluid, when sensitized to magnetic reaction, passes through the fluid pathway, thereby resulting in perceivable separation of the sensitized particles.

10 Claims, 2 Drawing Sheets

MAGNETIC FIELD SEPARATION AND ANALYSIS SYSTEM

The subject application is a file-wrapper continuation of U.S. patent application Ser. No. 081,223, filed Aug. 4, 1987, now abandoned.

BACKGROUND OF THE INVENTION

This application pertains to the art of magnetic separation, and more particularly to magnetic separation of biological materials.

The invention is particularly applicable to analysis of biological substances and will be described with particular reference thereto, although it will be appreciated that the invention has broader applications such as analysis of any substance containing magnetically sensitive particles, or particles which have been made susceptible to magnetic influence.

Ferrography is a method of particle separation relying on interaction between an external magnetic field and magnetic dipole moments of particles. The first published use of ferrography was in 1972 by Siefert and Westcott, and that use was particularly for industrial applications. Such industrial applications included monitoring of wear debris in oil or grease lubricants, and hydraulic systems, as well as gas stream monitoring of non-lubricant wash components. On-line systems have been developed for these industrial applications. Ferrography has proven itself in early wear detection and in prescribing preventative maintenance for non-catastrophic down time of man-made machines.

To date, ferrography has made only limited impact in bio-medical applications. Experience consists primarily of analysis of wear in natural and in prosthetic joints. Some experience of magnetic analysis of erythrocytes in white blood cell separations, and that of a few bacterial strains have been reported. The use of magnetic fields, such as in high-gradient magnetic separators ("HGMS"), for the separation of cells has been described and applied with various approaches.

Filters utilizing the principle of HGMS have been specifically noted to retain deoxygenated or oxidized (methemoglobin) erythrocytes while permitting other blood components to pass through. For other cells, such as certain leucocytes and other cellular classes which lack intrinsic magnetic properties, it has been demonstrated that they can be separated by first allowing them to phagocytize magnetic particles, bind magnetic microspheres, rosette erythrocytes containing paramagnetic methemoglobin, or be infected with malarial parasites (used for erythrocytes).

A further method of conferring magnetic susceptibility to cells or biological molecules is through antibodies and bio-molecules coupled to a highly magnetic protein containing iron or paramagnetic elements, such as ferritin. It is possible to separate immunoferritin-coated cells from a mixed population.

Many problems are encountered when attempting to apply industrial-type ferrography to the area of biological fluid analysis. Many problems are associated with analysis of magnetically low susceptible biological particles in the conventional ferrographic technique due to less than optimal fluid dynamics, low magnetic field gradients, and the lack of adequate magnetizers. Further problems are found in that often times a sample of biological material must be isolated from the outside as it often contains transmittable diseases.

The present invention contemplates a new and improved magnetic field separation analysis system which overcomes all of the above-referred problems, and others, and provides a means for analysis of biological fluids which is simple, economical and safe.

SUMMARY OF THE INVENTION

In accordance with the present invention, there is provided a flow chamber for passing a biological fluid through a magnetic field. The flow chamber promotes fluid flow therethrough by a combination of gravitational and capillary action. A container holds the fluid to be analyzed. The fluid passes from this container, through the magnetic field and finally to an absorption means.

In accordance with a more limited aspect of the invention, a sensitizing agent for promoting susceptibility of the biological fluid to magnetic interaction is contained within the container.

In accordance with another aspect of the present invention, a magnet means is provided for supplying a magnetic field to the biological fluid. The magnet means include first and second pole portions which form a generally linear gap therebetween. The magnet means includes a generally planar portion positioned so as to have a vertical component, whereby gravitational acceleration will be present along the surface thereof. Means are provided to secure an associated fluid flow chamber to the planar portion of the magnetic means.

In accordance with the more limited aspects of the invention, the magnetic means is adapted to secure a flow chamber at an angle to the linear gap between the pole pieces.

In accordance with another aspect of the present invention, a flow chamber is mounted on the magnetic means, and particularly over the linear gap between the pole pieces.

The principal object of the invention is the provision of an apparatus and method for magnetic field separation and analysis of various substances.

Another object of the invention is the provision of a magnetic separation and analysis system particularly suited for medical usage in the analysis of biological fluids.

An advantage of the present invention is that sensitization of a biological fluid to a magnetic field and the analysis thereof may be easily accomplished in a self-contained unit.

Another advantage of the present invention is that the substance to be analyzed may be isolated from the environment.

Yet another advantage is that analysis may be faciliated in a single sterile, effective, and disposable unit.

Further objects and advantages will become apparent to one of ordinary skill in the art upon a reading and understanding of the accompanying specification and drawings.

BRIEF DESCRIPTION OF THE DRAWINGS

The invention may take physical form in certain parts and arrangement of parts, and the performance of certain steps, preferred embodiments of which will be described in detail in this specification and illustrated in the accompanying drawings which form a part hereof and wherein.

DETAILED DESCRIPTION OF THE PREFERRED EMBODIMENT

Figure 1:
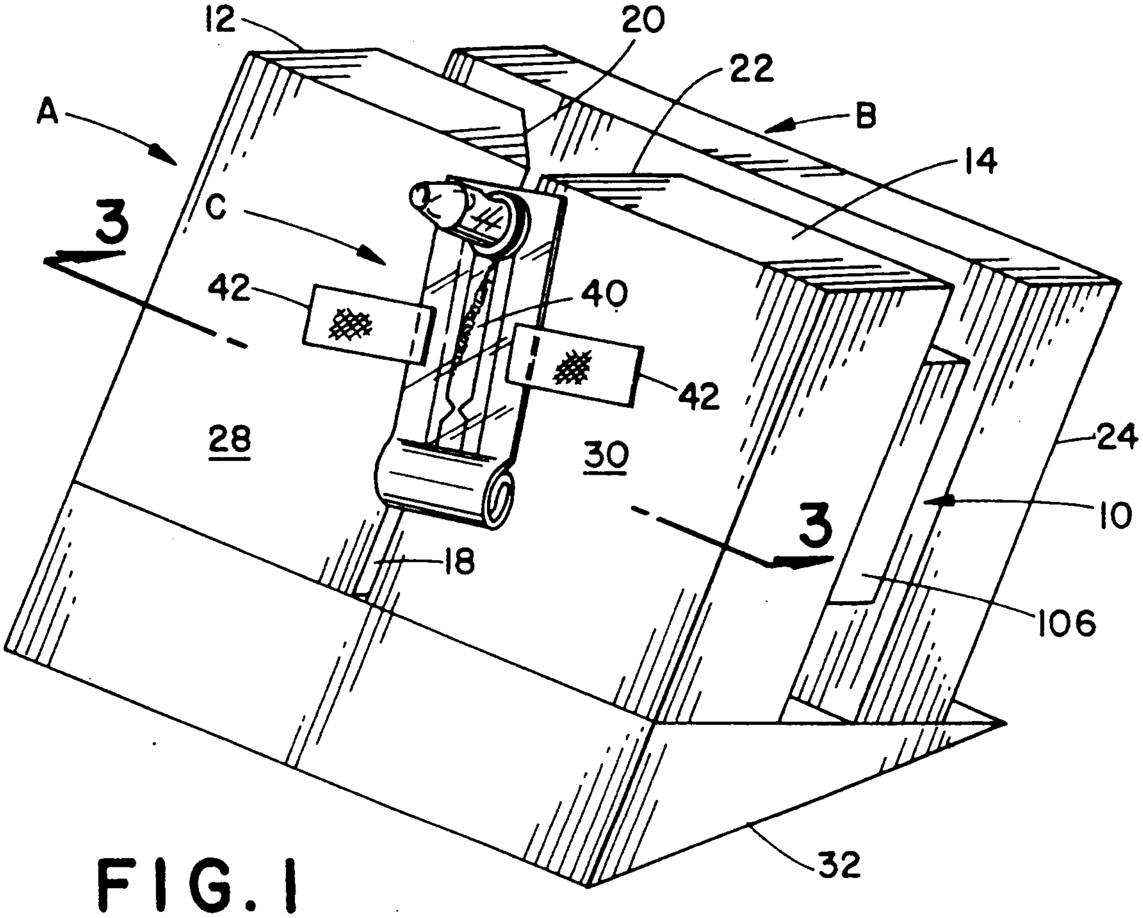
FIG. 1 is a perspective view of a magnetic separation system of the present invention.

Referring now to the drawings wherein the showings are for the purposes of illustrating the preferred embodiments of the invention only and not for the purposes of limiting the same, a magnetic separation unit A includes a magnet means B and a flow chamber C. The magnet means B includes a permanent magnet means 10, which, in the preferred embodiment, is comprised of two portions 10*a* and 10*b*, as will be more fully described below. The portions 10*a* and 10*b* abut first and second pole members 12, 14, respectively, which are comprised of a ferrous material.

The magnet 10 is fabricated to establish opposite magnetic polarities across a generally linear gap 18, the gap width being suitably in the general area of 1 mm to 5 mm wide. The pole members 12, 14 have respective angled cuts 20, 22 to facilitate an increase of magnetic flux at the generally linear gap 18. The pole members 12, 14, being comprised of a ferrous substance, maintain generally hospitable paths for magnetic flux resultant from the permanent magnet 10. Adequate magnetic field strength for operability of the present system is found at 1.0 Tesla at the center of the gap, but stronger field strength promotes better separation.

The magnet means B further includes a base 24, similarly comprised of an iron compound, which serves to further amplify the amount of flux present at the generally linear gap 18.

The pole members 12, 14 include generally planar portions 28, 30 which are generally co-planar with one another. A planar section is thereby formed which is generally parallel to the linear gap 18. The planar portions 28, 30 are adapted to have secured thereto an associated fluid pathway means as will be described below.

Magnet means B further includes a stand 32, suitably comprised of any non-magnetic or non-ferrous compound, such as aluminum. The stand 32 functions to orient the planar portions 28, 30 of the pole members 12, 14 so as to have a vertical component, thereby facilitating gravitational acceleration along a direction thereof. The non-ferrous construction of the stand 32 promotes orientation of the planar portions without interference of the magnetic flux patterns established by the permanent magnet 10, the pole members 12, 14, and the base 24. The linear gap 18 between the pole members 12, 14 is thereby oriented so as to have a component thereof in the vertical direction. Variations in the vertical component, and accordingly, gravitational acceleration along the planar portions 28, 30 may be accomplished by varying the dimensions of the base 32. Alternatively an adjustment means, such as a ratched hinge assembly, may be provided in the base 32 to afford easy variation of the acceleration component.

The flow chamber C includes a fluid pathway portion 40 which intersects the linear gap 18 so as to allow fluid flowing therethrough to be exposed to the high magnetic flux region present at the linear gap 18. The particular construction of the flow chamber C and its fluid pathway will be explained ' detail below. In a preferred embodiment the fluid pathway 40 is mounted at a non-parallel angle tangent to the linear gap 18. Variations in the angle allow for different degrees of acceleration of fluid due to gravitation, as well as changing the length of the magnetic flux exposure region which interacts with fluid flowing through the pathway 40.

The flow chamber C is suitably secured to one or both planar portions 28, 30 by a fastening means 42 which may be comprised simply of cellophane tape, as illustrated in the figure, or alternatively, by any other suitable fastening means such as a spring biased mounting clip.

Figure 2:
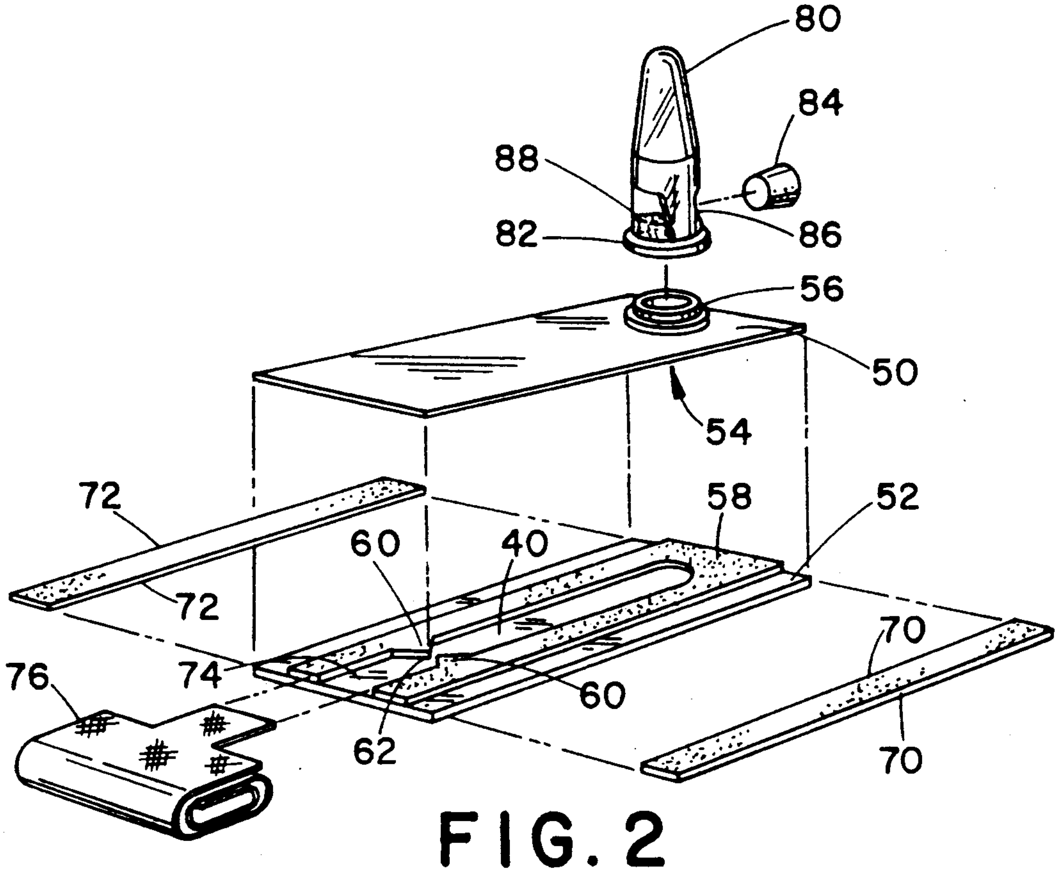
FIG. 2 shows, in exploded form, a flow chamber of the type employed in the apparatus of FIG. 1.

Turning to FIG. 2, a detailed description of the construction of the flow chamber C will be set forth. The flow chamber is formed so as to promote capillary flow therethrough, and is of generally planar construction, with the plane thereof being positionable generally parallel to the planar portions 28, 30. The flow chamber is preferrably comprised of a first plate portion 50 and a second plate portion 52. The flow chamber may also suitably comprised of a radially compressed tube which has an elongated oval cross-section.

At least one, and ideally both, of the plate portions are preferrably comprised of a transparent material, such as glass or clear plastic, to facilitate viewing of a substance therethrough.

The first plate portion 50 includes an aperture means 54 around which is mounted, in sealing relationship to second plate portion 52, a receiving means or ring 56. As will be seen below, the receiving means 56 is dimensioned to allow for sealingly mounting of an associated sample container in fluid flow relationship to the aperture 54.

Disposed between the plate portions is a resinous region 58 which is suitably comprised of a silicone rubber sealant. Resin of the resinous region 58 is disposed so as to form the fluid pathway 40 which extends from the aperture 54. The pathway may, however, be formed entirely from glass, plastic, etc. The plate portions may be treated with any of the commonly known surfactants to facilitate fluid flow therealong. A suitable surfactant is found in polyoxyethylene type compounds, such as that sold by BASF Corp. of Parsipanny, N.J., under the trademark PLURONIC F-68.

A width of the fluid pathway 40 is defined in a range which is advantageous for the particular substance to be analyzed, with one suitable size being 6 mm for bacteria analysis. A pinched portion of the fluid pathway 40 is formed by projections 60 of the resinous region therein to form an opening 62. The width of the opening 62 of this pinched region may be varied and, by way of example, a 1 mm wide pathway has been found to be adequate.

Upon application of the resin so as to form the resinous region 58, the first plate portion 50 is affixed to the second plate portion 52 so as to render them generally co-planar by use of affixing tape or means 70 and 72. The use of one or more layers of a double-sided sticky cellophane tape facilitates construction of a flow chamber with varying heights, dependent upon the characteristics of the biological fluid to be analyzed. As illustrated, two strips have been used to provide a flow chamber generally 150 micrometers high. This height provides for the capillary flow for certain biological substances, and may of course be varied in accordance with the properties of the fluid to be analyzed.

Disposed at an opposite end of the fluid pathway 40 from the aperture 54 is an exit opening 74, into which is placed a waste sample collection means 76 which is suitably comprised of any absorbant material, such as common filter paper or blotter paper or the like. Absorptive properties of the collection means 76 further facilitate transport of fluid through the fluid pathway 40. The projections 60 function as a limiting means to limit ingress of the sample collection means 76 into the fluid pathway 40. It will be noted that regulation of the extent of projections 60 may be adapted to regulate the extent to which fluid is absorbed into the collection means 76 by varying the size of opening 62.

Sealingly securable to the first plate portion 50 and by the receiving means 56 is a sample container 80. The sample container 80 is affixed to the first plate portion 50 via the receiving means 56 so that any material or fluid located therein may pass through the aperture 54 to the fluid pathway 40. A stopper means 84, such as a cork, as illustrated, or simply a piece of cellophane tape or the like, is placeable to seal an opening 86 of the sample container 80.

In the preferred embodiment, the sample container 80 is initially disconnected from the receiving means 56, and is sealed at one end thereof by a cap 82. The cap 82 is removable to allow for placement of a substance to be analyzed into the sample container 80. The cap 82 may be replaced at such time to facilitate agitation of contents of the sample container 80. The cap 82 has generally the same dimensions as the receiving means 56. This facilitates removal of the cap 82 from the sample container 80, and affixation of the sample container 80 to the receiving means 56. In this fashion, the contents of the sample container 80 may then be passed therefrom through the aperture 54. The cap 82 may alternately be comprised of a membrane-like material which may be punctured by suitable projections on the receiving means 56, thereby providing means for passage of a substance from the sample container 80 through the aperture 54.

As biological substances are, to a large extent, not readily responsive to a magnetic field, it is often desirable to pre-treat them to sensitize them prior to exposure to a magnetic field. This is accomplished by means of a sensitizing agent 88. In the arrangement of FIG. 2, a pre-measured amount of such a sensitizing agent 88 is placed in the sample container 80. This construction makes it possible to remove the cap 82 and place a substance to be analyzed into the sample container wherein the cap may be replaced, and the mixing thereof with the sensitizing agent may be accomplished. This may be aided by mechanical agitation of the fluid/sensitizing agent mixture.

Suitable sensitizing agents include solutions having a cation of a high magnetic dipole moment. The cation binds to negatively charged sites on a surface of a particle to be separated, thus increasing their magnetic susceptibility. These include the rare earth elements (such as erbium, $Er3+$). Of course, other magnetic sensitization agents may also be used effectively. For example, a 0.25 mM to 5 mM $ErCl_3$ in 0.9% NaCl solution with a processing time for mixture of 15–60 minutes is suitable. Other suitable means includes implementation of antibody conjugate paramagnetic tagging. Additionally, any magnetic or paramagnetic bead having a surface coating to promote absorption of selected particles.

It will be seen from the foregoing that fluid flow of a substance to be analyzed takes place over a region of high magnetic flux concentration. Flow is accomplished by gravitational acceleration, capillary action and absorption. Variations in an angle of fluid pathway to vertical, the absorptive material, and the size of the fluid pathway chamber may therefore regulate the velocity at which exposure of a fluid to a magnetic field region is accomplished.

Figure 3:
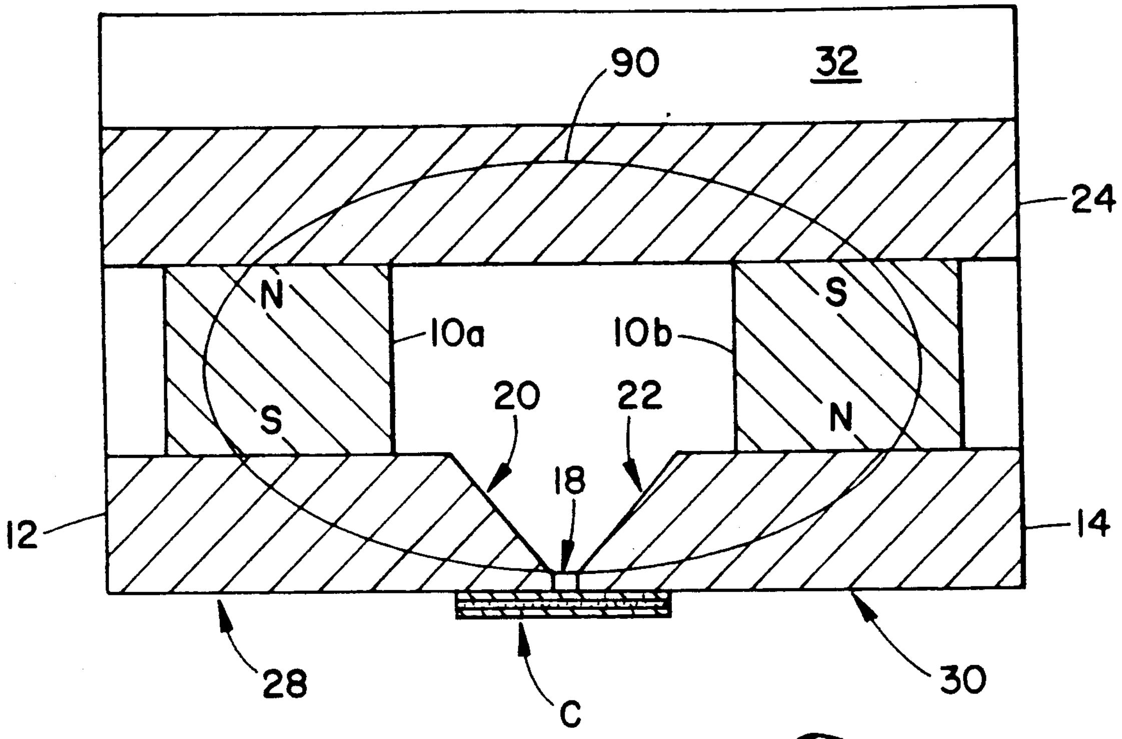
FIG. 3 shows a cross-sectional view of a magnet means of FIG. 1.

Turning now to FIG. 3, a cross-sectional view taken along the illustrated section of FIG. 1 is provided. It will be seen therefrom that each of the permanent magnets 10*a* and 10*b* is oriented in such a polarity so as to provide a continuous flux path around a generally closed ring, an opening being provided at the linear gap 18. The flux path, illustrated generally at 90, runs through the magnet 10*a*, the base 24, the magnet 10*b*, the pole piece 14, the gap 18, and the pole piece 12 wherein the path is completed. As disclosed above, a high flux region is thereby presented at the gap region 18.

The present invention will be further described with respect to the analysis of a substance in accordance with the above-described process and apparatus.

Figure 4:
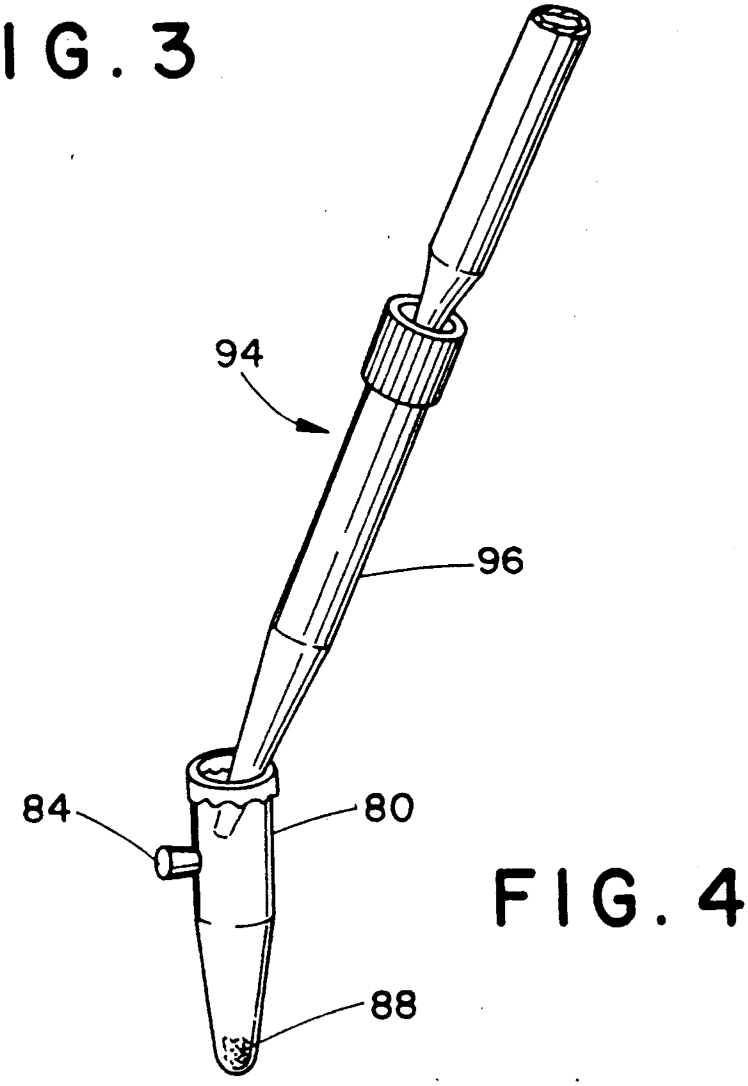
FIG. 4 is a perspective view depicting preparation of a substance for analysis is the present system.

A flow chamber C (see FIG. 2) which has been prepared as above-described is obtained. The cap 82 is removed and a fluid to be analyzed is placed into the sample container 80 for example, by means of a pipette 94 (see FIG. 4), which is illustrated as one having a disposable end portion 96, wherein it is exposed to the sensitizing agent 88. The cap 82 is then replaced to facilitate interaction of sensitizing agent with the substance to be analyzed and to isolate this mixture from the exterior. Mixing may be augmented through mechanical agitation. The sample container 80 may alternatively be affixed at this point to the receiving means 56 prior to agitation. In this procedure, it is preferable that the aperture 54 be raised above the remainder of the sample container 80, or another suitable means or method be implemented to hinder entrance of any fluid into the pathway 40 until mixing is complete.

The flow chamber is then mounted on the magnet means B at a pre-selected orientation to allow for fluid flow through the high-flux region of the linear gap 18 between the pole members 28 and 30. At this time, the stopper means 84 is removed from the opening 86 to allow for air to enter the sample container. The air displaces fluid flowing through aperture 54 thereby promoting flow.

Upon exposure to the high-flux region, magnetized particles in the subject fluid will be separated and distributed in the flow chamber. Residual fluid then is passed through opening 62 and finally collected or absorbed into collection means 76.

The use of transparent slides in the construction of the flow chamber C facilitates visual inspection or optical testing of the residue of the biological fluid which was resultant from exposure to the high magnetic field. Inspection may be manual or it may be alternatively accomplished by any of a myriad of visual inspection apparatuses such as commonly exist in the art. An inexpensive light detection system incorporated into the body of the magnetic separator serves to provide means to measure or inspect the quantity of magnetic deposition on line (as the sample flows), and off line. Such facilitates a review of separated particles without the necessity of removing the flow chamber C therefrom.

Implementation of staining of a sample provides for color coding of magnetically separated and concentrated bacteria (e.g. Gram staining). Color sensitive light detectors are particularly suited for quick identification of stained bacteria and other biological substances.

Analysis of separated magnetic particles may additionally be facilitated by incorporation of slides which include hatching or grids to facilitate counting of particles in respective regions. An adequate range of grid size in a square pattern to facilitate analysis of magnetically separated particles is generally in the range of 10 micrometers to 1 millimeter.

The invention has been described with reference to preferred embodiments. Obviously, modifications and alterations will occur to others upon reading and understanding of the specification. It is intended that all such modifications and alterations be included insofar as they come within the scope of the claims or the equivalents thereof.

Having thus described the invention, it is now claimed:

1. An apparatus for magnetic separation of materials comprising:

first and second opposed magnetic pole members spaced so as to define at least one gap region therebetween;

a fluid flow chamber means detachable from the pole members including:

first and second substantially planar members positioned so as to form a fluid pathway defining a selected flow direction adapted for passing an associated fluid through the magnetic field propagated about the pole members;

receiving means in association with the fluid flow chamber means and in fluid communication with the fluid pathway;

a sample container in fluid communication with the receiving means; and securing means for securing the fluid flow chamber means in a selected position with respect to the at least one gap region such that the selected flow direction is disposed at a non-parallel angle tangent to the at least one gap region, whereby the associated fluid flowing in the fluid pathway is exposed to a varying amount of magnetic flux.

2. The magnetic separation apparatus of claim 1 wherein the fluid flow chamber means is dimensioned so as to promote fluid flow therethrough by capillary action.

3. The magnetic separation apparatus of claim 2 wherein at least one of the first and second substantially planar members includes optically transparent material.

4. The magnetic separation apparatus of claim 3 further comprising sensitizing agent being contained in the sample container, whereby the associated fluid will contact the sensitizing agent upon placement thereof in the sample container.

5. The magnetic separation apparatus of claim 4 wherein the fluid flow chamber means includes a constricted portion to restrict flow of the associated fluid therethrough.

6. A method of performing magnetic separation of fluids comprising the steps of:

(a) defining a surface exteriorly to at least one gap formed between first and second pole members of a magnet;

(b) securing a substantially planar fluid pathway to said surface at a selected, non-parallel angle tangent to the at least one gap, whereby fluid flowing in the substantially planar fluid pathway is exposed to varying amounts of magnetic flux;

(c) passing magnetically sensitive fluid through the substantially planar fluid pathway, the pathway being of such dimensions so as to promote flow of the magnetically sensitive fluid therethrough;

(d) exposing the magnetically sensitive fluid in the substantially planar fluid pathway to a magnetic field whereby the fluid is exposed to varying strengths of magnetic fields dependent upon the angle at which the fluid pathway is secured; and (e) removing the magnetically sensitive fluid from the substantially planar fluid pathway after passage thereof through the magnetic field.

7. A method of performing magnetic separation of fluids comprising the steps of:

(a) passing magnetically sensitive fluid through a substantially planar fluid pathway, the fluid pathway being of such dimensions so as to promote flow in a selected direction of the fluid therethrough;

(b) passing the magnetically sensitive fluid at a selected, non-parallel angle tangent to an intersection of first and second pole members of a magnet from which the magnetic field emanates;

(c) exposing the magnetically sensitive fluid in the fluid pathway to a magnetic field; and (d) removing the magnetically sensitive fluid from the fluid pathway by absorbing the magnetically sensitive fluid from the fluid pathway into an absorbent material after passage thereof through the magnetic field.

8. The method of performing magnetic separation of fluids of claim 7 further comprising the step of acquiring data indicative of properties of the magnetically sensitive fluid by analysis of distribution of a component of the magnetically sensitive fluid resultant from exposure to the magnetic field.

9. An apparatus for magnetic separation of an associated fluid comprising:

magnet means for supplying a magnetic field at a substantially linear gap region defined between first and second pole members thereof;

the magnet means including a substantially planar member substantially parallel to the substantially linear gap;

the substantially planar member being positioned so as to have a vertical component, whereby gravitational acceleration will be present along a surface of the substantially planar member;

fluid pathway means for passing an associated fluid through the magnetic field associated with the magnet means with a substantially linear direction of propagation wherein fluid flow is promoted by capillary action;

communicating means for communicating the associated fluid onto the fluid pathway means;

means for securing the fluid pathway means to the magnet means such that the substantially linear direction of propagation is not parallel to the substantially linear gap and on a plane tangent to the substantially linear gap so as to allow for passage of the associated fluid through the magnetic field;

a container means detachable from the communicating means for holding the associated fluid securely separated from the fluid pathway means, and containing means to sensitize the associated fluid;

means for securing the fluid pathway means at an angle to the substantially linear gap whereby an amount of the fluid pathway means which is exposed to the substantially linear gap region is dependent upon the angle at which the fluid pathway means is secured; and absorption means associated with the fluid pathway means for removing the associated fluid from the fluid pathway means after passage thereof through the magnetic field.

10. The magnetic separation apparatus of claim 9 wherein the fluid pathway means includes first and second substantially planar members positioned so as to form a substantially planar flow region therebetween.

* * * * *